(12) United States Patent
Darolia

(10) Patent No.: US 6,558,813 B2
(45) Date of Patent: May 6, 2003

(54) ARTICLE HAVING A PROTECTIVE COATING AND AN IRIDIUM-CONTAINING OXYGEN BARRIER LAYER

(75) Inventor: Ramgopal Darolia, West Chester, OH (US)

(73) Assignee: General Electric Co., Cincinnati, OH (US)

( * ) Notice: Subject to any disclaimer, the term of this patent is extended or adjusted under 35 U.S.C. 154(b) by 0 days.

(21) Appl. No.: 09/917,568

(22) Filed: Jul. 27, 2001

(65) Prior Publication Data

US 2003/0022016 A1 Jan. 30, 2003

(51) Int. Cl.[7] .............................. B32B 15/04; F03B 3/12; C25D 3/50
(52) U.S. Cl. ..................... 428/632; 428/652; 428/670; 428/469; 427/252; 205/257; 205/264
(58) Field of Search ................... 428/632, 633, 428/652, 656, 669, 670, 629, 469, 699, 701, 702, 332, 336; 427/252; 205/257, 264; 416/241 R

(56) References Cited

U.S. PATENT DOCUMENTS

| 3,639,219 A | 2/1972 | Skomoroski |
| 4,399,199 A | 8/1983 | McGill et al. |
| 4,721,551 A | 1/1988 | Byers et al. |
| 5,914,189 A | 6/1999 | Hasz et al. |
| 6,168,875 B1 | 1/2001 | Cybulsky et al. |

OTHER PUBLICATIONS

Hideki Hosoda et al., "Potential of IrAl base alloys as ultrahigh–temperature smart coatings", *Intermetallics*, vol. 8, 2000, pp. 1081–1090. No Date.

Primary Examiner—Deborah Jones
Assistant Examiner—Jennifer McNeil

(57) ABSTRACT

A protected article includes a substrate, such as a nickel-base superalloy, a protective coating comprising aluminum overlying a surface of the substrate, and an iridium-containing oxygen barrier layer overlying the protective coating. A ceramic thermal barrier coating may overlie the protective coating and the oxygen barrier layer.

20 Claims, 3 Drawing Sheets

ARTICLE HAVING A PROTECTIVE COATING AND AN IRIDIUM-CONTAINING OXYGEN BARRIER LAYER

This invention relates to the protection of surfaces from excessive oxidation using a aluminum-containing protective coating and, more particularly, to the prevention of excessive oxidation of the protective coating.

BACKGROUND OF THE INVENTION

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades and vanes, which turns the shaft and provides power to the compressor and fan. In a more complex version of the gas turbine engine, the compressor and a high pressure turbine are mounted on one shaft, and the fan and low pressure turbine are mounted on a separate shaft. The hot exhaust gases flow from the back of the engine, driving it and the aircraft forward.

The hotter the combustion and exhaust gases, the more efficient is the operation of the jet engine. There is thus an incentive to raise the combustion and exhaust-gas temperatures. The maximum temperature of the combustion gases is normally limited by the materials used to fabricate the turbine vanes and turbine blades of the turbine, upon which the hot combustion gases impinge. In current engines, the turbine vanes and blades are made of nickel-based superalloys, and can operate at temperatures of up to about 1900–2150° F.

Many approaches have been used to increase the operating temperature limits of turbine blades, turbine vanes, and other hot-section components to their current levels. For example, the composition and processing of the base materials themselves have been improved, and a variety of solidification techniques have been developed to take advantage of oriented grain structures and single-crystal structures. Physical cooling techniques may also be used.

The surfaces of the articles may be protected with an aluminum-containing protective coating, whose surface oxidizes to an aluminum oxide scale that inhibits further oxidation of the surfaces. However, the aluminum oxide scale is relatively permeable to oxygen. During service, oxygen diffuses from the environment and through the aluminum oxide scale to the underlying aluminum-containing protective coating, whereupon more aluminum oxide is formed. This formation of aluminum oxide is good to a point, but the formation of too thick an aluminum oxide scale may lead to spallation of the aluminum oxide scale, consumption of the aluminum in the aluminum-containing protective coating, and the loss of protection of the underlying substrate. Excessive diffusion of oxygen may also lead to excessive oxidation of the underlying substrate.

There is therefore a need for an improved approach to the aluminum-containing protective coatings on surfaces of materials used at high temperatures, such as nickel-base superalloys. The present invention fulfills this need, and further provides related advantages.

BRIEF SUMMARY OF THE INVENTION

The present invention provides a protected article that is protected both by an aluminum-containing protective coating and a layer that is highly impervious to oxygen. The aluminum oxide scale forms on the aluminum-containing protective coating to protect the underlying substrate. The oxygen barrier layer inhibits further diffusion of oxygen to the aluminum-containing protective layer, so that it does not form too thick an aluminum oxide scale, which is prone to failure by spallation, and is not consumed too rapidly. The result is a longer-lived protection of the underlying article.

A protected article includes a substrate and a protective structure overlying a surface of the substrate. The protective structure comprises a protective coating comprising aluminum and overlying the surface of the substrate, and an oxygen barrier layer comprising an iridium alloy having at least about 70 percent by weight iridium and overlying the protective coating. The iridium alloy preferably has no more than about 90 percent by weight iridium. The oxygen barrier layer preferably has a thickness of from about 5 micrometers to about 50 micrometers.

The substrate is preferably a nickel-base alloy such as a nickel-base superalloy. The protective coating may be a diffusion aluminide such as a simple diffusion aluminide, an example being a nickel aluminide, or a complex diffusion aluminide such as a platinum aluminide. The protective coating may instead be an overlay coating such as an MCrAlX overlay coating. A ceramic thermal barrier coating may overlie the protective coating and the oxygen barrier layer.

In this layered system, the aluminum-containing protective coating oxidizes to form an aluminum oxide scale that protects the substrate article from excessively rapid oxidation. The iridium-containing oxygen barrier layer, which may be quite thin because of the low permeability of oxygen in high-iridium alloys, inhibits the diffusion of oxygen to and through the aluminum oxide scale to the underlying protective coating. The result is that the aluminum oxide scale does not grow too thick or too rapidly, so that it may continue to protect the surface for extended periods of time.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
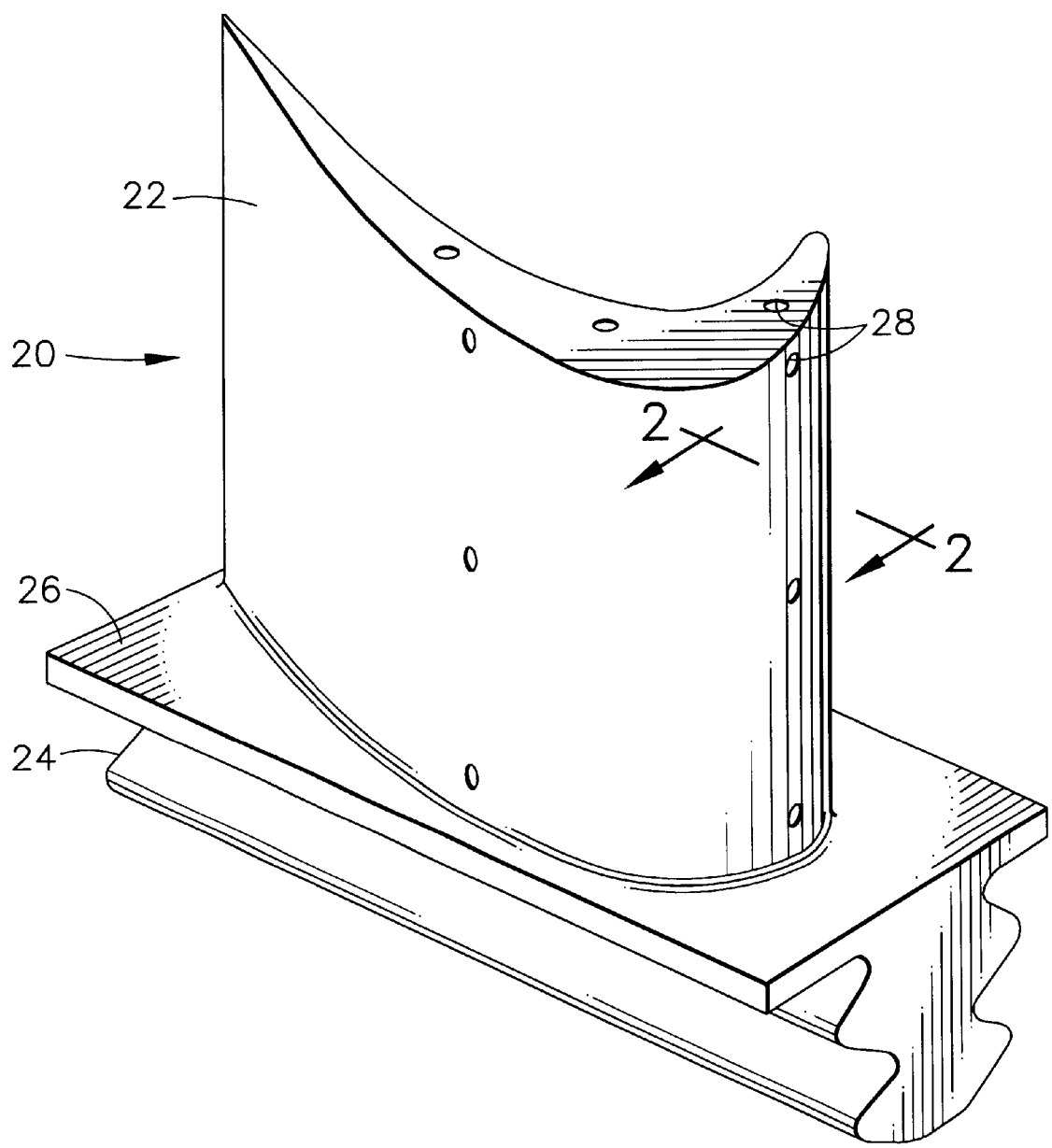
FIG. 1 is a perspective view of a turbine blade.

FIG. 1 depicts a component article of a gas turbine engine such as a turbine blade or turbine vane, and in this illustration a turbine blade 20. The turbine blade 20 is formed of any operable material, but is preferably a nickel-base superalloy. The turbine blade 20 includes an airfoil section 22 against which the flow of hot exhaust gas is directed. (The turbine vane or nozzle has a similar appearance in respect to the pertinent airfoil section, but typically includes other end structure to support the airfoil.) The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24. Optionally, a number of internal passages extend through the interior of the airfoil 22, ending in openings 28 in the surface of the airfoil 22. During service, a flow of cooling air is directed through the internal passages to reduce the temperature of the airfoil 22.

Figure 2:
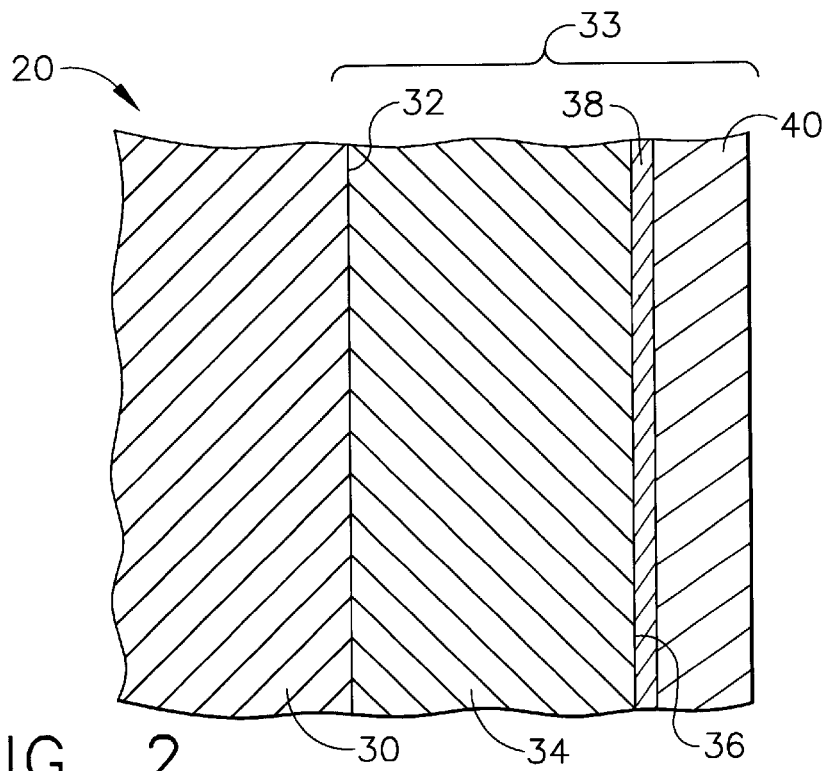
FIG. 2 is an enlarged schematic sectional view through the turbine blade of FIG. 1, taken on lines 2—2.

FIG. 2 is a sectional view through a portion of a portion of the turbin blade 20, here the airfoil section 22. The turbine blade 20 has a body that serves as a substrate 30 with a surface 32. Overlying and contacting the surface 32 is a protective structure 33 including a protective coating 34 comprising aluminum. The protective coating 34 overlies the surface of the substrate 30 and may be of any operable type. Several types of protective coating 34 are known in the art.

The protective coating 34 may be a diffusion aluminide that initially includes only aluminum and elements diffused into the protective coating 34 from the substrate 30, or is a modified diffusion aluminide that initially includes other elements such as platinum, chromium, or hafnium. In the simple diffusion aluminide, aluminum is deposited onto the surface 32 and interdiffused with the elements of the substrate 30. The modified diffusion aluminide may be formed by depositing a layer of another element, such as platinum, onto the surface 32, and then depositing the aluminum layer (either pure aluminum or doped with a modifying element) overlying the layer of the other element. The layers are interdiffused with the material of the substrate. In these cases, the aluminum layer may contain a modifying element such as hafnium, yttrium, zirconium, chromium, or silicon, or combinations thereof.

The protective coating 34 may instead be an MCrAlX overlay coating. The terminology "MCrAlX" is a shorthand term of art for a variety of families of overlay protective coatings 34 that may be employed as environmental coatings or bond coats in thermal barrier coating systems. In this and other forms, M refers to nickel, cobalt, iron, and combinations thereof. In some of these protective coatings, the chromium may be omitted. The X denotes elements such as hafnium, zirconium, yttrium, tantalum, rhenium, platinum, silicon, titanium, boron, carbon, and combinations thereof. Specific compositions are known in the art. Some examples of MCrAlX compositions include NiAlCrZr (as disclosed in U.S. Pat. No. 6,153,313) and NiAlZr (as disclosed in U.S. Pat. No. 6,255,001), but this listing of examples is not to be taken as limiting.

The protective coating 34 is preferably from about 0.0005 to about 0.005 inch thick, but thicker or thinner protective coatings are operable.

For any of these types of protective coatings 34, an upper surface 36 of the protective coating 34 oxidizes to form an adherent aluminum oxide scale 38. The aluminum oxide scale 38 is considered to be part of the protective coating 34. This aluminum oxide scale 38 is quite thin, desirably on the order of about 0.0001 to about 0.0002 inch in thickness.

Overlying and contacting the protective coating 34 (and the aluminum oxide scale 38 as well) is an oxygen barrier layer 40. The oxygen barrier layer 40 comprises at least about 70 percent by weight iridium, and most preferably is from about 70 to about 90 percent by weight iridium. If the oxygen barrier layer 40 has less than about 70 percent by weight iridium (near the aluminum-iridium eutectic point), the oxygen-barrier properties of the iridium become too diluted and the oxygen-barrier effectiveness is degraded, and the melting point of the oxygen barrier layer 40 is reduced so that it is prone to melting in service. If the oxygen barrier layer 40 is more than about 90 percent by weight iridium, and particularly for pure iridium, the high-iridium material is subject to vaporization in air at temperatures above about 1390 K, near the service temperature of the protected article.

The oxygen barrier layer 40 preferably has a thickness of from about 5 to about 50 micrometers. If the oxygen barrier layer 40 is thinner than about 5 micrometers, it does not impart sufficient oxygen impermeability. If the oxygen barrier layer 40 is thicker than about 50 micrometers, it tends to prevent sufficient oxygen from reaching the protective layer to form the aluminum oxide scale 38 and is also wasteful of the expensive element iridium.

Figure 3:
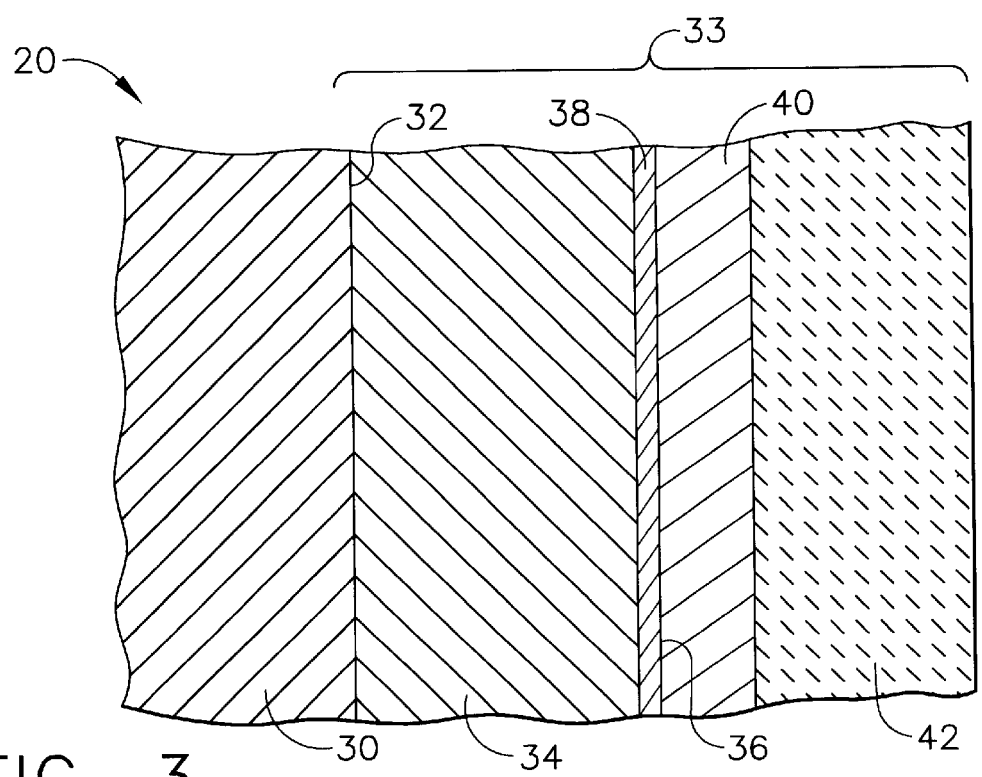
FIG. 3 is a schematic sectional view like that of FIG. 2, illustrating another embodiment.

FIG. 3 is a schematic sectional view like that of FIG. 2, illustrating another embodiment. (FIGS. 2 and 3 are not drawn to scale.) The structure of FIG. 3 is like that of FIG. 2, and the prior description is incorporated here, except that a ceramic thermal barrier coating 42 overlies and contacts the oxygen barrier layer 40. The ceramic thermal barrier coating 42 is preferably from about 0.003 to about 0.010 inch thick, most preferably about 0.005 inch thick. The ceramic thermal barrier coating 42 is preferably yttria-stabilized zirconia, which is zirconium oxide containing from about 3 to about 12 weight percent, preferably from about 4 to about 8 weight percent, of yttrium oxide. Other operable ceramic materials may be used as well. The ceramic thermal barrier coating 42 may be deposited by any operable technique, such as electron beam physical vapor deposition or plasma spray.

Figure 4:
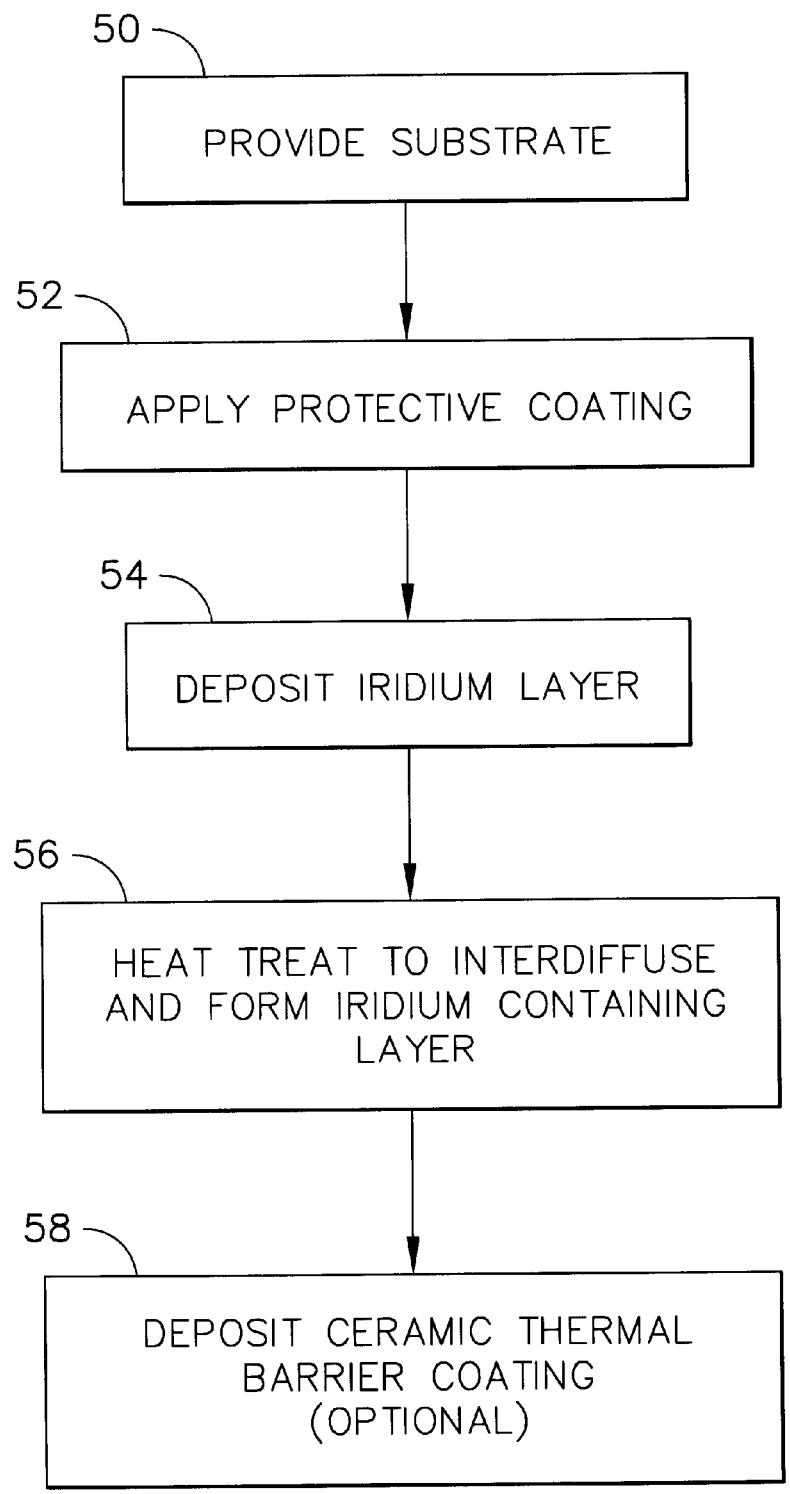
FIG. 4 is a block flow diagram of an approach for preparing a coated gas turbine airfoil.

FIG. 4 is a block flow diagram of a preferred method for practicing the invention. An article substrate is provided, numeral 50. The article is preferably a component of a gas turbine engine such as a gas turbine blade or vane (or "nozzle", as the vane is sometimes called). The article is most preferably made of a nickel-base superalloy. As used herein, "nickel-base" means that the composition has more nickel present than any other element. The nickel-base superalloys are typically of a composition that is strengthened by the precipitation of gamma-prime phase. The preferred nickel-base alloy has a composition, in weight percent, of from about 4 to about 20 percent cobalt, from about 1 to about 10 percent chromium, from about 5 to about 7 percent aluminum, from 0 to about 2 percent molybdenum, from about 3 to about 8 percent tungsten, from about 4 to about 12 percent tantalum, from 0 to about 2 percent titanium, from 0 to about 8 percent rhenium, from 0 to about 6 percent ruthenium, from 0 to about 1 percent niobium, from 0 to about 0.1 percent carbon, from 0 to about 0.01 percent boron, from 0 to about 0.1 percent yttrium, from 0 to about 1.5 percent hafnium, balance nickel and incidental impurities.

A most preferred alloy composition is René N5, which has a nominal composition in weight percent of about 7.5 percent cobalt, about 7 percent chromium, about 6.2 percent aluminum, about 6.5 percent tantalum, about 5 percent tungsten, about 1.5 percent molybdenum, about 3 percent rhenium, about 0.05 percent carbon, about 0.004 percent boron, about 0.15 percent hafnium, up to about 0.01 percent yttrium, balance nickel and incidental impurities. Other operable superalloys include, for example, René N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities; René 142, which has a nominal composition, in weight percent, of about 12 percent cobalt, about 6.8 percent chromium, about 1.5 percent molybdenum, about 4.9 percent tungsten, about 6.4 percent tantalum, about 6.2 percent aluminum, about 2.8 percent rhenium, about 1.5 percent hafnium, about 0.1 percent carbon, about 0.015 percent boron, balance nickel and incidental impurities; CMSX-4, which has a nominal composition in weight percent of about 9.60 percent cobalt, about 6.6 percent chromium, about 0.60 percent molybdenum, about 6.4 percent tungsten, about 3.0 percent rhenium, about 6.5 percent tantalum, about 5.6 percent aluminum, about 1.0 percent titanium, about 0.10 percent hafnium, balance nickel and incidental impurities; CMSX- 10, which has a nominal composition in weight percent of about 7.00 percent cobalt, about 2.65 percent chromium, about 0.60 percent molybdenum, about 6.40 percent tungsten, about 5.50 percent rhenium, about 7.5 percent tantalum, about 5.80 percent aluminum, about 0.80 percent titanium, about 0.06 percent hafnium, about 0.4 percent niobium, balance nickel and incidental impurities; PWA1480, which has a nominal composition in weight percent of about 5.00 percent cobalt, about 10.0 percent chromium, about 4.00 percent tungsten, about 12.0 percent tantalum, about 5.00 percent aluminum, about 1.5 percent titanium, balance nickel and incidental impurities; PWA1484, which has a nominal composition in weight percent of about 10.00 percent cobalt, about 5.00 percent chromium, about 2.00 percent molybdenum, about 6.00 percent tungsten, about 3.00 percent rhenium, about 8.70 percent tantalum, about 5.60 percent aluminum, about 0.10 percent hafnium, balance nickel and incidental impurities; and MX-4, which has a nominal composition as set forth in U.S. Pat. No. 5,482,789, in weight percent, of from about 0.4 to about 6.5 percent ruthenium, from about 4.5 to about 5.75 percent rhenium, from about 5.8 to about 10.7 percent tantalum, from about 4.25 to about 17.0 percent cobalt, from 0 to about 0.05 percent hafnium, from 0 to about 0.06 percent carbon, from 0 to about 0.01 percent boron, from 0 to about 0.02 percent yttrium, from about 0.9 to about 2.0 percent molybdenum, from about 1.25 to about 6.0 percent chromium, from 0 to about 1.0 percent niobium, from about 5.0 to about 6.6 percent aluminum, from 0 to about 1.0 percent titanium, from about 3.0 to about 7.5 percent tungsten, and wherein the sum of molybdenum plus chromium plus niobium is from about 2.15 to about 9.0 percent, and wherein the sum of aluminum plus titanium plus tungsten is from about 8.0 to about 15.1 percent, balance nickel and incidental impurities. The use of the present invention is not limited to these preferred alloys, and has broader applicability.

The protective coating 34 is applied, numeral 52. In the preferred case of a diffusion aluminide protective coating 34, the aluminum layer is deposited by any operable approach, with vapor deposition preferred. In that approach, a hydrogen halide activator gas, such as hydrogen chloride, is contacted with aluminum metal or an aluminum alloy to form the corresponding aluminum halide gas. Any modifying elements may be doped into the aluminum layer from a corresponding gas, if desired. The aluminum halide gas contacts the substrate 30, depositing the aluminum thereon. The deposition occurs at elevated temperature such as from about 1825° F. to about 1975° F. so that the deposited aluminum atoms interdiffuse into the substrate 30 during a 4 to 20 hour cycle. This technique allows alloying elements to be deposited into the aluminum layer if desired, from the halide gas.

If the protective coating is a platinum (or palladium or rhodium) aluminide, a first coating layer is deposited onto the surface 32 of the substrate 30 before the aluminum layer is deposited. This first coating is preferably accomplished by electrodeposition. For the preferred platinum deposition, the deposition is preferably accomplished by placing a platinum-containing solution into a deposition tank and depositing platinum from the solution onto the substrate 30. An operable platinum-containing aqueous solution is $Pt(NH_3)_4HPO_4$ having a concentration of about 4–20 grams per liter of platinum, and the voltage/current source is operated at about ½–10 amperes per square foot of facing article surface. The platinum first coating layer, which is preferably from about 1 to about 6 micrometers thick and most preferably about 5 micrometers thick, is deposited in 1–4 hours at a temperature of 190–200° F.

In the case of the MCrAlX overlay-protective coating 34, the protective coating 34 is deposited by any operable physical vapor deposition technique, such as sputtering, cathodic arc or electron beam, or any plasma spray technique such as atmospheric plasma spray (APS) or low pressure plasma spray (LPPS).

The oxygen barrier layer 40 is deposited overlying and contacting the protective coating 34 (including its aluminum oxide scale 38), numeral 54. An iridium layer is preferably deposited by electrodeposition. Electroplating techniques for depositing iridium layers are known in the art for other purposes and are disclosed, for example, in U.S. Pat. Nos. 4,721,551 and 3,639,219, whose disclosures are incorporated by reference. The iridium layer is preferably pure iridium, but it may be an iridium-containing alloy.

After the iridium layer is deposited, it and the underlying structure are typically heat treated, numeral 56, to interdiffuse the elements of the iridium layer, the protective coating 34, and the substrate 30. The resulting oxygen barrier layer 40 includes iridium, preferably in an amount of from about 70 to about 90 percent by weight, with the balance elements diffused into the oxygen barrier layer from the protective coating and the substrate, such as nickel and aluminum. A preferred heat treatment is from about 4 to about 16 hours at a temperature of from about 1800° F. to about 2000° F., in a non-oxidizing atmosphere.

The ceramic thermal barrier coating 42 is optionally applied, numeral 58. The application of the ceramic thermal barrier coating is preferably accomplished by electron beam physical vapor deposition or plasma spray.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A protected article, comprising:
   a substrate;
   a protective structure overlying a surface of the substrate, the protective structure comprising
      a protective coating comprising aluminum and overlying the surface of the substrate, and
      an oxygen barrier layer of an alloy of at least about 70 percent by weight iridium with the balance of the alloy being elements interdiffused into the oxygen barrier layer from the substrate and the protective coating, wherein the oxygen barrier layer overlies the protective coating.

2. The protected article of claim 1, wherein the protective coating is a diffusion aluminide.

3. The protected article of claim 1, wherein the protective coating is selected from the group consisting of a platinum aluminide and a nickel aluminide.

4. The protected article of claim 1, wherein the protective coating is an overlay coating.

5. The protected article of claim 1, wherein the protective structure further includes a ceramic thermal barrier coating overlying the protective coating.

6. The protected article of claim 1, wherein the substrate is a nickel-base alloy.

7. The protected article of claim 1, wherein the substrate is a nickel-base superalloy.

8. The protected article of claim 1, wherein the oxygen barrier layer has a thickness of from about 5 micrometers to about 50 micrometers.

9. The protected article of claim 1, wherein the oxygen barrier layer is an iridium alloy having from about 70 to about 90 percent by weight iridium.

10. A method of protecting an article, comprising the steps of providing a substrate comprising at least a portion of the article;

depositing a protective structure overlying a surface of the substrate, the protective structure comprising a protective coating comprising aluminum and overlying the surface of the substrate, and a layer comprising iridium overlying the protective coating; and heating the substrate and the protective structure to interdiffuse the protective coating and the layer comprising iridium, to form an oxygen barrier layer that is at least about 70 percent by weight iridium with the balance of the oxygen barrier layer being elements interdiffused into the oxygen barrier layer from the substrate and the protective coating.

11. The method of claim 10, wherein the step of depositing the protective structure comprises the step of depositing the protective coating as a diffusion aluminide.

12. The method of claim 10, wherein the step of depositing the protective structure comprises the step of depositing the protective coating selected from the group consisting of a platinum aluminide and a nickel aluminide.

13. The method of claim 10, wherein the step of depositing the protective structure comprises the step of depositing the protective coating as an overlay coating.

14. The method of claim 10, wherein the step of depositing the protective structure comprises the step of depositing a ceramic thermal barrier coating overlying the oxygen barrier layer.

15. The method of claim 10, wherein the step of providing the substrate includes the step of providing a nickel-base alloy substrate.

16. The method of claim 10, wherein the step of heating includes the step of forming the oxygen barrier layer with a thickness of from about 5 micrometers to about 50 micrometers.

17. The method of claim 10, wherein the step of heating includes the step of forming the oxygen barrier layer having from about 70 to about 90 percent by weight iridium.

18. The method of claim 10, wherein the step of depositing includes the step of depositing the layer comprising iridium as a layer of pure iridium.

19. The method of claim 10, wherein the step of depositing the protective structure includes the step of electrodepositing the layer comprising iridium.

20. The method of claim 10, wherein the step of depositing the protective structure includes the step of electrodepositing the layer comprising iridium as pure iridium.

* * * * *